United States Patent
Kawanishi et al.

(10) Patent No.: US 10,124,795 B2
(45) Date of Patent: Nov. 13, 2018

(54) DRIVING FORCE CONTROL SYSTEM FOR HYBRID VEHICLE

(71) Applicant: TOYOTA JIDOSHA KABUSHIKI KAISHA, Toyota-shi, Aichi-ken (JP)

(72) Inventors: Hiroshi Kawanishi, Miyoshi (JP); Atsushi Tabata, Okazaki (JP); Tatsuya Imamura, Okazaki (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 123 days.

(21) Appl. No.: 15/348,414

(22) Filed: Nov. 10, 2016

(65) Prior Publication Data

US 2017/0137020 A1    May 18, 2017

(30) Foreign Application Priority Data

Nov. 13, 2015  (JP) .................................. 2015-223263

(51) Int. Cl.
*B60W 20/20* (2016.01)
*B60K 6/365* (2007.10)
(Continued)

(52) U.S. Cl.
CPC ............. *B60W 20/20* (2013.01); *B60K 6/365* (2013.01); *B60K 6/387* (2013.01); *B60K 6/445* (2013.01); *B60L 11/14* (2013.01); *B60W 10/02* (2013.01); *B60W 10/06* (2013.01); *B60W 10/08* (2013.01); *B60W 10/10* (2013.01); *B60W 20/00* (2013.01);
(Continued)

(58) Field of Classification Search
CPC ............ Y02T 10/6286; Y02T 10/6239; B60W 20/20; B60W 20/00; B60W 10/10; B60W 10/08; B60W 10/02; B60W 20/40; B60W 10/06; B60W 30/18036; B60W 2710/021; B60W 2520/06; B60K 6/365; B60K 6/387; B60K 6/445; B60K 2006/381; B60L 11/14; B60L 2240/32; B60L 2420/507; B60Y 2300/182; B60Y 2300/91; B60Y 2400/112; B60Y 2400/428

See application file for complete search history.

(56) References Cited

U.S. PATENT DOCUMENTS 6,005,297 A    12/1999  Sasaki et al.
6,886,648 B1   5/2005   Hata et al.
(Continued)

FOREIGN PATENT DOCUMENTS

JP    H10-089117 A    4/1998
JP    2000-209706 A   7/2000
(Continued)

*Primary Examiner* — Thomas Ingram
(74) *Attorney, Agent, or Firm* — Hunton Andrews Kurth LLP

(57) ABSTRACT

A driving force control system for a hybrid vehicle is provided to reduce a shock resulting from switching a travelling direction between the forward direction and the backward direction. The control system is applied to a hybrid vehicle in which an operating mode can be selected at least from a series mode and a series parallel mode. A travelling direction of the vehicle is switched by a shifting device between forward direction and backward direction. A controller is configured to maintain the previous operating mode after switching the travelling direction of the vehicle by the shifting device.

6 Claims, 13 Drawing Sheets

(51) Int. Cl.
| | |
|---|---|
| *B60W 20/00* | (2016.01) |
| *B60W 20/10* | (2016.01) |
| *B60W 10/08* | (2006.01) |
| *B60K 6/387* | (2007.10) |
| *B60W 10/02* | (2006.01) |
| *B60K 6/445* | (2007.10) |
| *B60L 11/14* | (2006.01) |
| *B60W 20/40* | (2016.01) |
| *B60W 10/06* | (2006.01) |
| *B60W 30/18* | (2012.01) |
| *B60K 6/38* | (2007.10) |
| *B60W 10/10* | (2012.01) |

(52) U.S. Cl.
CPC ....... *B60W 20/40* (2013.01); *B60K 2006/381* (2013.01); *B60L 2240/32* (2013.01); *B60L 2240/40* (2013.01); *B60L 2240/507* (2013.01); *B60W 30/18036* (2013.01); *B60W 2520/06* (2013.01); *B60W 2710/021* (2013.01); *B60Y 2300/182* (2013.01); *B60Y 2300/91* (2013.01); *B60Y 2400/112* (2013.01); *B60Y 2400/428* (2013.01); *Y02T 10/6239* (2013.01); *Y02T 10/6286* (2013.01); *Y10S 903/914* (2013.01)

(56) References Cited

U.S. PATENT DOCUMENTS

| | | | |
|---|---|---|---|
| 2012/0208671 A1* | 8/2012 | Zhu | B60K 6/387 477/5 |
| 2013/0005529 A1* | 1/2013 | Chen | B60K 6/442 477/4 |
| 2015/0045179 A1* | 2/2015 | Okuwaki | B60K 6/445 477/5 |
| 2015/0072819 A1 | 3/2015 | Ono et al. | |
| 2015/0211620 A1 | 7/2015 | Matsubara et al. | |

FOREIGN PATENT DOCUMENTS

| | | |
|---|---|---|
| JP | 2011-063136 A | 3/2011 |
| JP | 2012-071699 A | 4/2012 |
| JP | 2013177048 A | 9/2013 |
| WO | 2013114595 A1 | 8/2013 |
| WO | 2014-013556 A1 | 1/2014 |

\* cited by examiner

Fig. 4

|  |  |  |  | B0 | C0 | CS |
|---|---|---|---|---|---|---|
| EV Mode | Forward/Reverse | Single-Motor Mode | MG1 Connected |  |  | (O) |
|  |  |  | MG1 Disconnected |  | O |  |
|  |  | Dual-Motor Mode | | O | O |  |
| HV Mode | Series | Forward/Reverse | |  |  | O |
|  | Series Parallel | Forward | Variable |  | O |  |
|  |  |  | Fixed(Daul-Motor) |  | O | O |
|  |  | Reverse | |  | O |  |

DRIVING FORCE CONTROL SYSTEM FOR HYBRID VEHICLE

CROSS REFERENCE TO RELATED APPLICATIONS

The present application claims the benefit of priority to Japanese Patent Application No. 2015-223263 filed on Nov. 13, 2015 with the Japanese Patent Office, the entire contents of which are incorporated herein by reference in its entirety.

BACKGROUND

Field of the Disclosure

Embodiments of the present application relates to the art of a driving force control system for a hybrid vehicle having an engine and at least one motor for propelling the vehicle.

Discussion of the Related Art

JP-A-2012-071699 describes one example of a hybrid vehicle drive control device. An operating mode of the vehicle taught by JP-A-2012-071699 can be selected from a series parallel mode in which power generated by an engine is partially converted into an electric power by a first motor/generator and a second motor/generator is driven by the electric power generated by the first motor/generator to generate driving force, and an electric vehicle mode in which the vehicle is powered by at least one of the motor/generators. According to the teachings of JP-A-2012-071699, the vehicle is propelled backwardly in the electric vehicle mode by driving the second motor/generator backwardly while stopping the engine and the first motor/generator.

JP-A-2000-209706 also describes a hybrid drive unit in which the operating mode can be switched between a series hybrid mode and a parallel hybrid mode by manipulating engagement devices. According to the teachings of JP-A-2000-209706, the series hybrid mode is selected when propelling the vehicle in reverse.

Thus, according to the teachings of the above-mentioned prior art documents, the operating mode is shifted to a predetermined mode when propelling the vehicle in reverse. However, a shock may occur when switching from drive range to reverse range as a result of altering operating states of the engine and the motor and engagement states of clutches etc.

SUMMARY

Aspects of the present disclosure have been conceived noting the foregoing technical problems, and it is therefore an object of the present application is to provide a driving force control system for a hybrid vehicle that is configured to reduce a shock resulting from switching a travelling direction between the forward direction and the backward direction.

The driving force control system according to the present disclosure is applied to a hybrid vehicle, comprising an engine; a first motor having a generating function; a power distribution device that performs a differential action among an input element to which a torque of the engine is applied, a reaction element to which a torque of the first motor is applied, and an output element; an output member to which a torque is delivered from the output element; a first clutch that selectively allows torque transmission between the engine and a rotor of the first motor; a second clutch that selectively allows torque transmission between the engine and the output member through the power distribution device; and a second motor that is activated by an electric power generated by the first motor to generate a drive torque to propel the vehicle. In the vehicle, an operating mode can be selected at least from: a series mode in which the first clutch is engaged, the first motor is rotated by the engine to generate electric power, and the second motor is operated by the electric power generate by the first motor to propel the vehicle; and a series parallel mode in which at least the second clutch is engaged, and the vehicle is powered by the engine and the second motor. In order to achieve the above-explained objective, the driving force control system is provided with a shifting device that switches a travelling direction of the vehicle between forward direction and backward direction, and a controller that controls the operating mode of the vehicle. Specifically, the controller is configured to maintain the previous operating mode after switching the travelling direction of the vehicle by the shifting device.

In a non-limiting embodiment, the controller may be further configured to maintain the operating mode of the vehicle to the series mode after switching the travelling direction of the vehicle by the shifting device, if the vehicle was propelled in the series mode before switching the travelling direction of the vehicle.

In a non-limiting embodiment, the controller may be further configured to maintain the operating mode of the vehicle to the series parallel mode after switching the travelling direction of the vehicle by the shifting device, if the vehicle was propelled in the series parallel mode before switching the travelling direction of the vehicle.

In a non-limiting embodiment, the operating mode of the vehicle may be further selected from an electric vehicle mode in which the vehicle is powered at least by the second motor. In addition, the controller may be further configured to: maintain the operating mode to the electric vehicle mode after switching the travelling direction of the vehicle by the shifting device unless a predetermined engine starting condition is satisfied, if the vehicle was propelled in the electric vehicle mode before switching the travelling direction of the vehicle, and shift the operating mode to the series mode after switching the travelling direction of the vehicle by the shifting device upon satisfaction of the predetermined engine starting condition, if the vehicle was propelled in the electric vehicle mode before switching the travelling direction of the vehicle.

Thus, according to the embodiment of the present application, the controller is configured to maintain the previous operating mode of the vehicle after switching the travelling direction of the vehicle by the shifting device. According to the embodiment of the present application, therefore, engagement states of the clutches and operating states of the engine will not be changed when switching the travelling direction of the vehicle between the forward direction and the backward direction. For this reason, it is possible to reduce shocks when switching the travelling direction of the vehicle between the forward direction and the backward direction.

As described, the operating mode is shifted to the series mode after switching the travelling direction of the vehicle upon satisfaction of the predetermined engine starting condition if the vehicle was propelled in the electric vehicle mode before switching the travelling direction. In this case, although the engine is started as a result of shifting the operating mode to the series mode, a driving force generated by the engine will not be applied directly to driving wheels. For this reason, it is also possible to reduce shocks even when the operating mode is shifted to the series mode.

BRIEF DESCRIPTION OF THE DRAWINGS

Features, aspects, and advantages of exemplary embodiments of the present disclosure will become better understood with reference to the following description and accompanying drawings, which should not limit the invention in any way.

FIG. 4 is a table showing engagement states of the clutches and the brake in each operating mode;

DETAILED DESCRIPTION OF THE PREFERRED EMBODIMENTS

Figure 1:
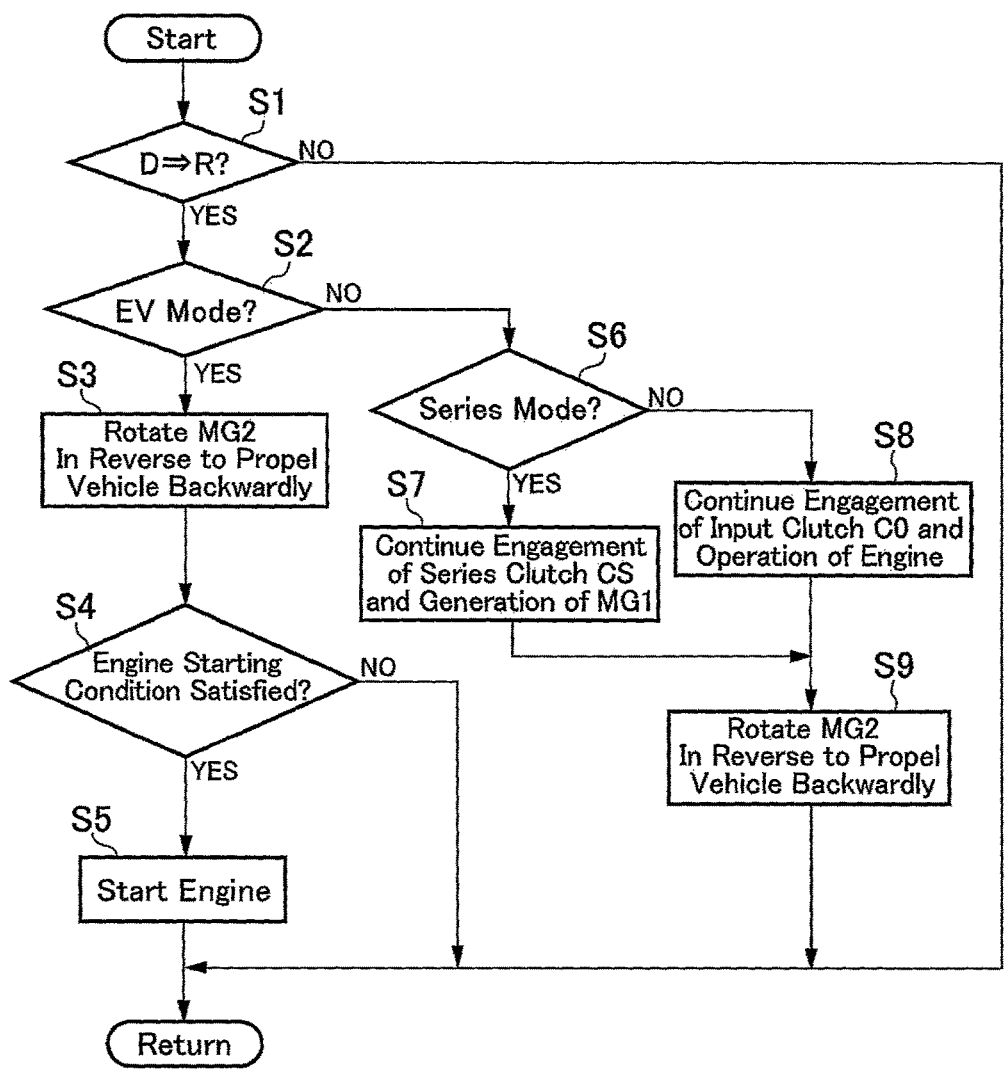
FIG. 1 is a flowchart showing one embodiment of a routine executed by the control system according to the present application.

Preferred embodiments of the present application will now be explained with reference to the accompanying drawings. Referring now to FIG. 2, there is shown the first example of the front engine-front drive layout hybrid vehicle to which the control system according to the present application is applied. The vehicle shown in FIG. 2 is provided with two motors and an internal combustion engine (as will be simply called the "engine" hereinafter) to power the vehicle, and in the vehicle, a plurality of transmission shafts are arranged parallel to each other. For example, a permanent magnet synchronous motor having a generating function may be used as the motor, and a gasoline engine or a diesel engine may be used as the engine. Here, it is to be noted that FIG. 1 merely shows connections between components, and actual positions and locations of the components should not be limited to those shown in FIG. 2.

In the vehicle shown in FIG. 2, a power distribution device 3 and a first motor (referred to as "MG1" in FIG. 1) 4 are arranged coaxially with an output shaft (i.e., a crankshaft) 2 of an engine (referred to as "ENG" in FIG. 2) 1. Specifically, the power distribution device 3 is a single-pinion planetary gear unit adapted to perform a differential action comprising a sun gear 5 as a reaction element, a ring gear 6 as an output element arranged concentrically with the sun gear 5, and a carrier 7 as an input element supporting planetary gears interposed between the sun gear 5 and the ring gear 6 in a rotatable manner. Alternatively, a double-pinion planetary gear unit may also be used as the power distribution device 3.

An input shaft 8 extending along a rotational center axis of the power distribution device 3 is connected to the output shaft 2, and an input clutch C0 as a second engagement device is arranged to selectively deliver torque of the engine 1 to drive wheels 23. A rotation of the output shaft 2 connected to the input shaft 8 is selectively halted by a brake B0.

Thus, the first motor 4 is disposed on an opposite side of the engine 1 across the power distribution device 3, and a first rotor shaft 10 as a hollow shaft integral with a first rotor 9 of the first motor 4 is connected to the sun gear 5. An intermediate shaft 11 penetrating through the first rotor shaft 10 while being allowed to rotate relatively with respect to the first rotor shaft 10 is connected to the input shaft 8 to be rotated integrally therewith. The intermediate shaft 11 is selectively connected to the first rotor shaft 10 by a series clutch CS as a first engagement device to selectively deliver an output torque of the engine 1 to the first rotor shaft 9.

The ring gear 6 of the power distribution device 3 is connected to an output gear 12 as an output member to be rotated integrally therewith, and hence the output torque of the engine 1 is delivered to the output gear 12 through the power distribution device 3 by engaging the input clutch C0 while establishing a reaction torque by the first motor 4. Thus, such torque transmission from the engine 1 to the output gear 12 through the power distribution device 3 is selectively achieved by manipulating the input clutch C0.

A countershaft 13 extends parallel to the output shaft 2 of the engine 1, the input shaft 8 and the intermediate shaft 11. A driven gear 14 is fitted onto one end of the countershaft 13 to be meshed with the output gear 12, and a first drive gear 15 is fitted onto the other end of the countershaft 13.

A second motor (referred to as "MG2" in FIG. 2) 16 also having a generating function is disposed parallel to the countershaft 13. A second drive gear 19 is fitted onto a second rotor shaft 18 integral with a second rotor 17 of the second motor 16 to be meshed with the driven gear 14. The second motor 16 is also a permanent magnet synchronous motor having a generating function, and an output torque of the second motor 16 is added to a torque delivered from the output gear 12.

A differential gear unit 20 as a final reduction is disposed parallel to the countershaft 13 and the second motor 16, and a ring gear 21 of the differential gear unit 20 is meshed with the drive gear 15 disposed on the countershaft 13. Powers of the engine 1 and the motors 4 and 16 are distributed to the drive wheels 23 through drive shaft 22.

The first motor 4 and the second motor 16 are electrically connected with a power source including a battery, a capacitor and an inverter (neither of which are shown). The first motor 4 and the second motor 16 are selectively operated as a motor and a generator by controlling a current supply from the power source, and the second motor 16 can be operated as a motor by an electric power generated by the first motor 4.

Figure 3:
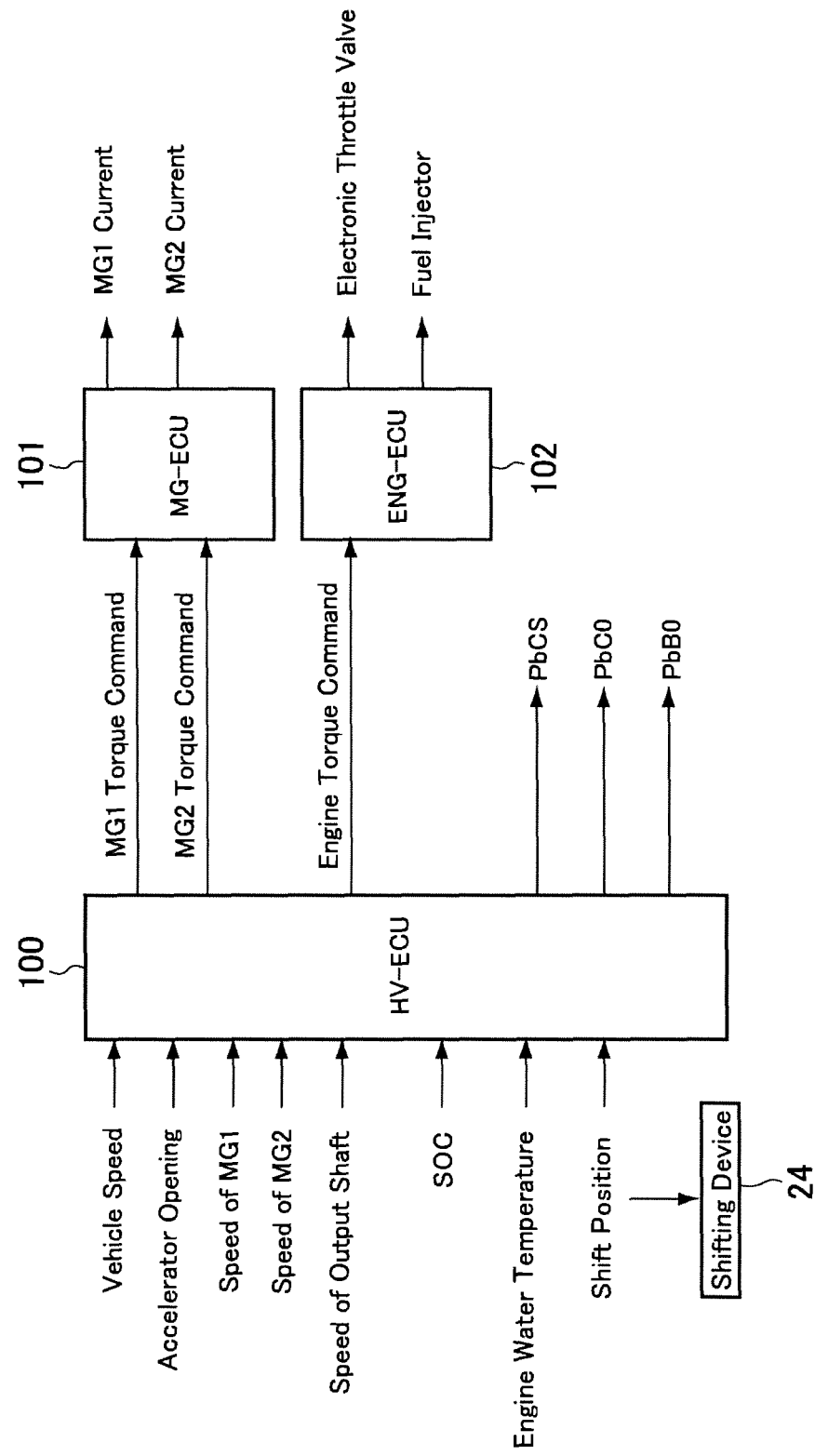
FIG. 3 is a block diagram schematically showing the control system.

An operating mode of the vehicle according to the preferred embodiment can be selected from an electric vehicle mode (abbreviated as the "EV mode" hereinafter) and a hybrid mode (abbreviated as the "HV mode" hereinafter), and the HV mode can be selected from a series mode and a series parallel mode. In order to electrically control the vehicle, the vehicle is provided with a hybrid control unit (as will be called the "HV-ECU" hereinafter) 100 as a controller. Turning to FIG. 3, there is shown a control system of the vehicle according to the preferred embodiment in more detail. The HV-ECU 100 is composed mainly of a microcomputer configured to carry out a calculation based on incident data, stored data and stored programs, and transmit a calculation result in the form of command signal. To this end, the HV-ECU 100 receives detection signals about a vehicle speed, an opening degree of an accelerator (or a required driving force), a speed of the first motor 4, a speed of the second motor 16, a speed of an output shaft (i.e., a speed of the output gear 12 or the countershaft 13), a state of charge (abbreviated as the "SOC" hereinafter) of the storage device, a temperature of engine water, a shift position shifted by a shifting device 24 and so on. Torque commands to the first motor 4 and the second motor 16 calculated by the HV-ECU 100 are sent to an after-mentioned motor control unit (as will be called the "MG-ECU" hereinafter) 101 that is also an electronic control unit, and a torque command to the engine 1 calculated by the HV-ECU 100 is sent to an after-mentioned engine control unit (as will be called the "EG-ECU" hereinafter) 102 that is also an electronic control unit. Hydraulic pressures applied to the input clutch C0, the series clutch CS and the brake B0 are controlled by controlling supply current to not shown solenoid valves for controlling the oil delivered to those engagement devices based on hydraulic commands PbCS, PbC0, and PbB0 calculated by the HV-ECU 100. According to the embodiment, specifically, the shifting device 24 is adapted to change a shift range by moving a shift lever among the Drive position, the Neutral position, and the Reverse position.

The MG-ECU 101 and the EG-ECU 102 are also configured to carry out a calculation based on incident data, stored data and stored programs, and to transmit a calculation result in the form of command signal. Specifically, the MG-ECU 101 is configured to calculate supply currents to the first motor 4 and the second motor 16 based on the torque commands transmitted from the HV-ECU 100, and to transmit current command signals to the first motor 4 and the second motor 16. The EG-ECU 102 is configured to calculate a target torque of the engine 1, and to transmit command signals to an electronic throttle valve and an ignitor (neither of which are shown) of the engine 1 to control an opening degree of the throttle valve and an ignition timing.

Engagement states of the clutches C0 and CS and the brake B0 in each operating mode are shown in FIG. 4. In FIG. 4, "O" represents an engagement of the engagement device. In the EV mode, the vehicle is propelled by an electric power of the storage device, and the EV mode can be selected from a single-motor mode in which the vehicle is powered at least by the second motor 16, and a dual-motor mode in which the vehicle is powered by both of the first motor 4 and the second motor 16. Further, the single-motor mode can be selected from a disconnecting mode in which the first motor 4 is disconnected from the powertrain in order not to be rotated, and a connecting mode in which the first motor 4 is connected to the second motor 16 and driving wheels 23 to be rotated passively.

In the disconnecting mode, the input clutch C0 and the brake B0 are disengaged and the clutch CS is disengaged according to need while activating the second motor 16 by the electric power from the storage device so that an output torque of the second motor 16 is delivered to the differential unit 20 through the countershaft 13. In this situation, although the output gear 12 is rotated by a rotation of the driven gear 14, the carrier 7 is allowed to rotate freely and hence the engine 1 and the first motor 4 are prevented from being rotated. Nonetheless, if a rotational speed of the first motor 4 is changed, such rotation of the first motor 4 may be halted by the HV-ECU 100 or energizing the first motor 4.

By contrast, in the connecting mode, only the input clutch C0 is engaged while activating the second motor 16 by the electric power from the storage device. In this situation, the carrier 7 is connected to the input shaft 8 to be prevented from being rotated so that the sun gear 5 is rotated in the opposite direction (i.e., in the counter direction) together with the first rotor shaft 10 and the first rotor 9 connected thereto. In the connecting mode, an electric energy regenerated by the second motor 16 during deceleration can be stored into the storage device. In addition, an engine braking force can be established during deceleration in the connecting mode by engaging the input clutch C0 to connect the engine 1 to the driving wheels 23 while raising a speed of the engine 1 by the first motor 4.

Figure 5A:
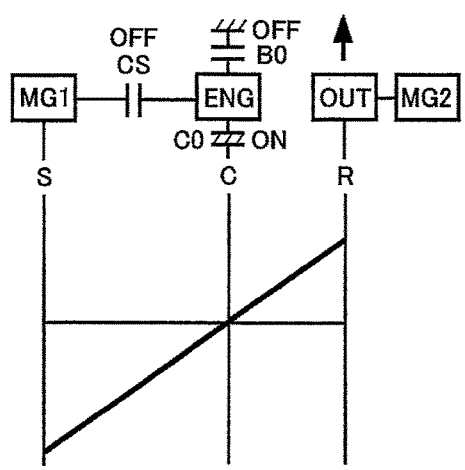
FIGS. 5a, 5b, 5c and 5d are nomographic diagrams showing status of the power distribution device shown in FIG. 2 in the electric vehicle mode and the series mode.
Figure 5B:
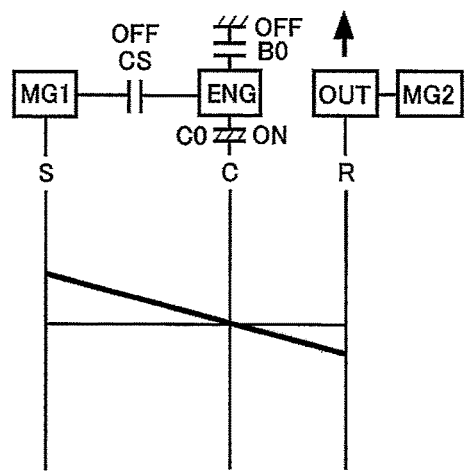

A status of the power distribution device 3 during forward propulsion in the connecting mode is indicated in a nomographic diagram shown in FIG. 5a, and a status of the power distribution device 3 during reverse propulsion in the connecting mode is indicated in a nomographic diagram shown in FIG. 5b. In FIGS. 5a, 5b, 5c and 5d, "ON" and "OFF" individually represents an engagement and a disengagement of the engagement element, and the arrow indicates a direction of the torque.

The dual-motor mode is established by engaging the input clutch C0 and the brake B0. In the dual-motor mode, both of the first motor 4 and the second motor 16 are activated by the electric power supplied from the storage device to propel the vehicle. In this case, the carrier 7 of the power distribution device 3 is halted and hence the ring gear 6 and the output gear 12 are rotated in the forward direction to propel the vehicle in the forward direction by rotating the first motor 4 in the counter direction. Consequently, an output torque of the first motor 4 is delivered from the output gear 12 to the differential gear unit 20 through the countershaft 13. In this situation, if the second motor 16 is rotated in the forward direction, an output torque thereof is added to the torque delivered from the output gear 12 at the countershaft 13 so that a total torque of the first motor 4 and the second motor 16 is delivered to the differential gear unit 20. Here, in the EV mode, an operating state of the power distribution device 3 will not be changed in a forward stage and in a reverse stage. For example, in the single motor-mode, the vehicle is propelled in the reverse direction by rotating the second motor 16 in the counter direction. By contrast, in the dual-motor mode, the vehicle is propelled in the reverse direction by rotating the second motor 16 in the counter direction while rotating the first motor 4 in the forward direction.

Figure 5C:
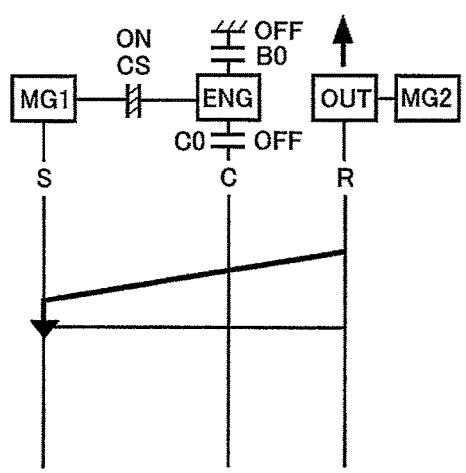
Figure 5D:
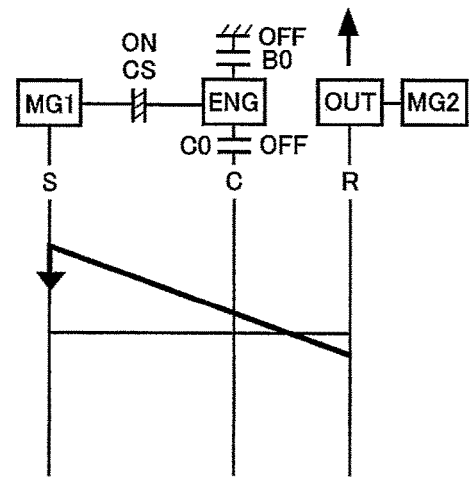

In the HV mode, the series mode is established by engaging only the series clutch CS. FIG. 5c shows an operating state of the power distribution device 3 under the situation in which the vehicle is propelled in the forward direction in the series mode. In the series mode, an output torque of the engine 1 is delivered to the first motor 4 through the series clutch CS so that the first motor 4 is operated as a generator. In this case, the carrier 7 of the power distribution device 3 is allowed to rotate freely and hence an output torque of the engine 1 is not delivered to the output gear 12. An electric power generated by the first motor 4 is supplied to the second motor 16 to operate the second motor 16 as a motor, and an output torque of the second motor 16 is delivered to the differential gear unit 20 through the countershaft 13 to propel the vehicle. In this situation, as indicated in FIG. 5c, the ring gear 6 is rotated in the forward direction in accordance with the vehicle speed, and the sun gear 5 is rotated at a same speed as the engine 1. Consequently, the carrier 7 is idled at a speed governed by rotational speeds of the ring gear 6 and the sun gear 5 and a gear ratio of the power distribution device 3 (i.e., a ratio between teeth number of the sun gear 5 and teeth number of the ring gear 6). In the series mode, a travelling direction of the vehicle can be switched between the forward direction and the backward direction by switching a rotational direction of the second motor 16. Specifically, as indicated in FIG. 5d, the vehicle is propelled in the reverse direction by reducing the speed of the engine 1 while rotating the second motor 16 in the counter direction.

In the series parallel mode, the vehicle is powered by the engine 1, the first motor 4 and the second motor 16. In a case of propelling the vehicle in the forward direction, the series parallel mode may be switched between a variable mode in which a ratio of an engine speed to an output shaft speed (e.g., speed of the output gear 12) can be varied continuously, and a fixed mode in which the power distribution device 3 is rotated integrally.

Figure 6A:
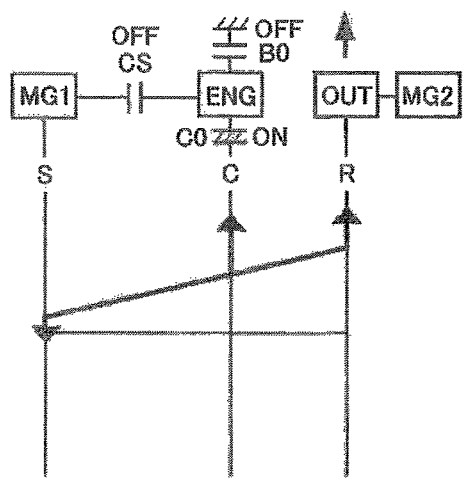
FIGS. 6a, 6b and 6c are nomographic diagrams showing status of the power distribution device shown in FIG. 2 in the series parallel mode.
Figure 6B:
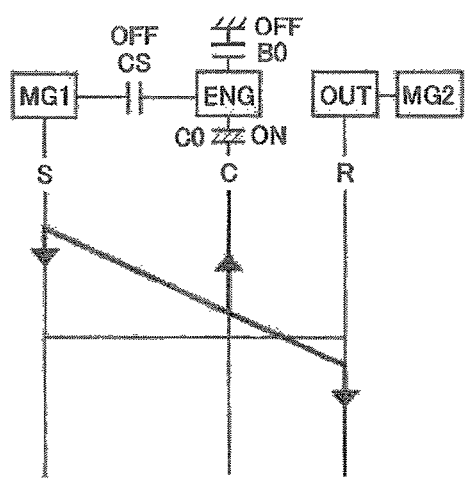

Specifically, during forward propulsion in the series parallel mode, the variable mode is established by engaging only the input clutch C0. FIG. 6a shows an operating state of the power distribution device 3 in the variable mode. In this case, an output torque of the engine 1 is delivered to the carrier 7 of the power distribution device 3 through the input clutch C0 so that the carrier 7 is rotated in the forward direction. In this situation, the first motor 4 is operated as a generator and hence a negative torque is applied to the sun gear 5. Consequently, the ring gear 6 and the output gear 12 integral therewith are rotated in the forward direction. An electric power generated by the first motor 4 is supplied to the second motor 16 to operate the second motor 16 as a motor, and an output torque of the second motor 16 is added to the torque delivered from the output gear 12 at the countershaft 13. Thus, in the variable mode, power of the engine 1 is partially delivered from the output gear 12 to the differential gear unit 20 through the power distribution device 3, and the remaining power of the engine 1 is once converted into an electric power to activate the second motor 16 and then converted into a drive torque by the second motor 16 to be delivered to the differential gear unit 20. In the variable mode, a speed of the engine 1 can be controlled in an optimally fuel efficient manner by controlling a speed of the first motor 4. In a case of propelling the vehicle in the backward direction in the series parallel mode, only the input clutch C0 is engaged. In this case, as indicated in FIG. 6b, the first motor 4 is rotated in the forward direction by the power of the engine 1 to serve as a generator, and the second motor 16 is rotated in the backward direction to serve as a motor.

Figure 6C:
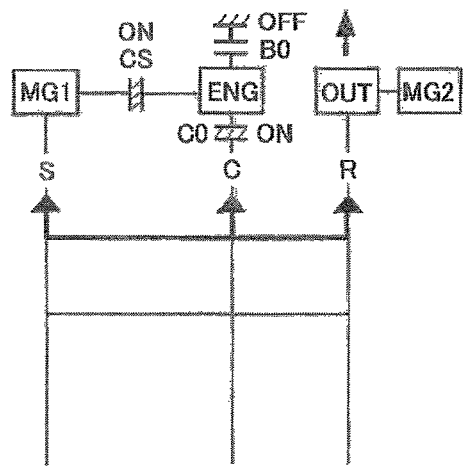

During forward propulsion in the series parallel mode, the fixed mode is established by engaging the input clutch C0 and the series clutch CS. FIG. 6c shows an operating state of the power distribution device 3 in the fixed mode. In this case, since the input clutch C0 and the series clutch CS are engaged, the carrier 7 is connected to the sun gear 5 so that the power distribution device 3 is rotated integrally. Consequently, an output torque of the engine 1 is delivered to the output gear 12 without being amplified or reduced. In this situation, the first motor 4 is connected to the engine 1 through the power distribution device 3, and hence an output torque of the first motor 4 driven as a motor by the electric power supplied from the storage device can be added to the output torque of the engine 1. Likewise, an output torque of the second motor 16 driven as a motor by the electric power supplied from the storage device may also be added to the output torque of the engine 1.

Figure 7:
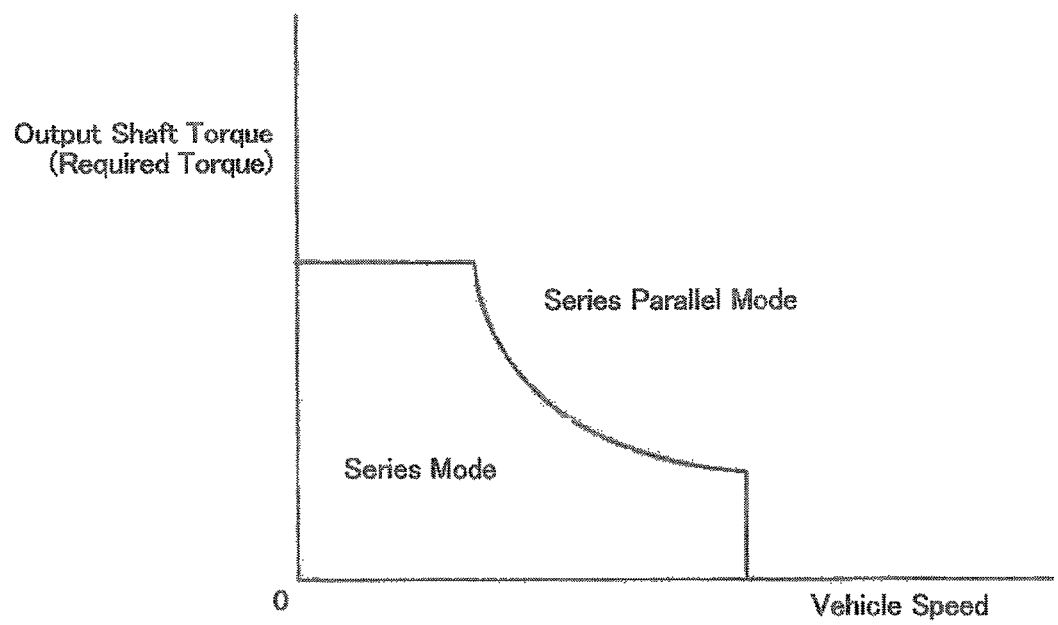
FIG. 7 is a map defining a boundary between the series mode and the series parallel mode based on an output shaft torque and a vehicle speed.

In the EV mode and the series mode, a maximum drive torque is governed by specifications of the first motor 4 and the second motor 16. For example, in the series mode, the maximum drive torque is limited to the maximum torque of the second motor 16, and as shown in FIG. 7, the maximum drive torque is reduced in accordance with an increase in the vehicle speed after the vehicle speed is increased to a certain level. According to the preferred example, therefore, the HV mode is shifted between the series mode and the series parallel mode with reference to the map shown in FIG. 7 defining operating regions of those modes based on the vehicle speed and the output shaft torque (or a required torque). In the HV mode, when the vehicle speed is low and the required torque is small, the operating mode may be shifted to the series mode to save fuel. By contrast, when the vehicle speed is high and the required torque is large, the series parallel mode may be selected to enhance driving performance. For example, the series parallel mode is selected when the sporty mode is selected to keep the engine speed to the higher speed and to establish an engine braking force to decelerate the vehicle.

Figure 2:
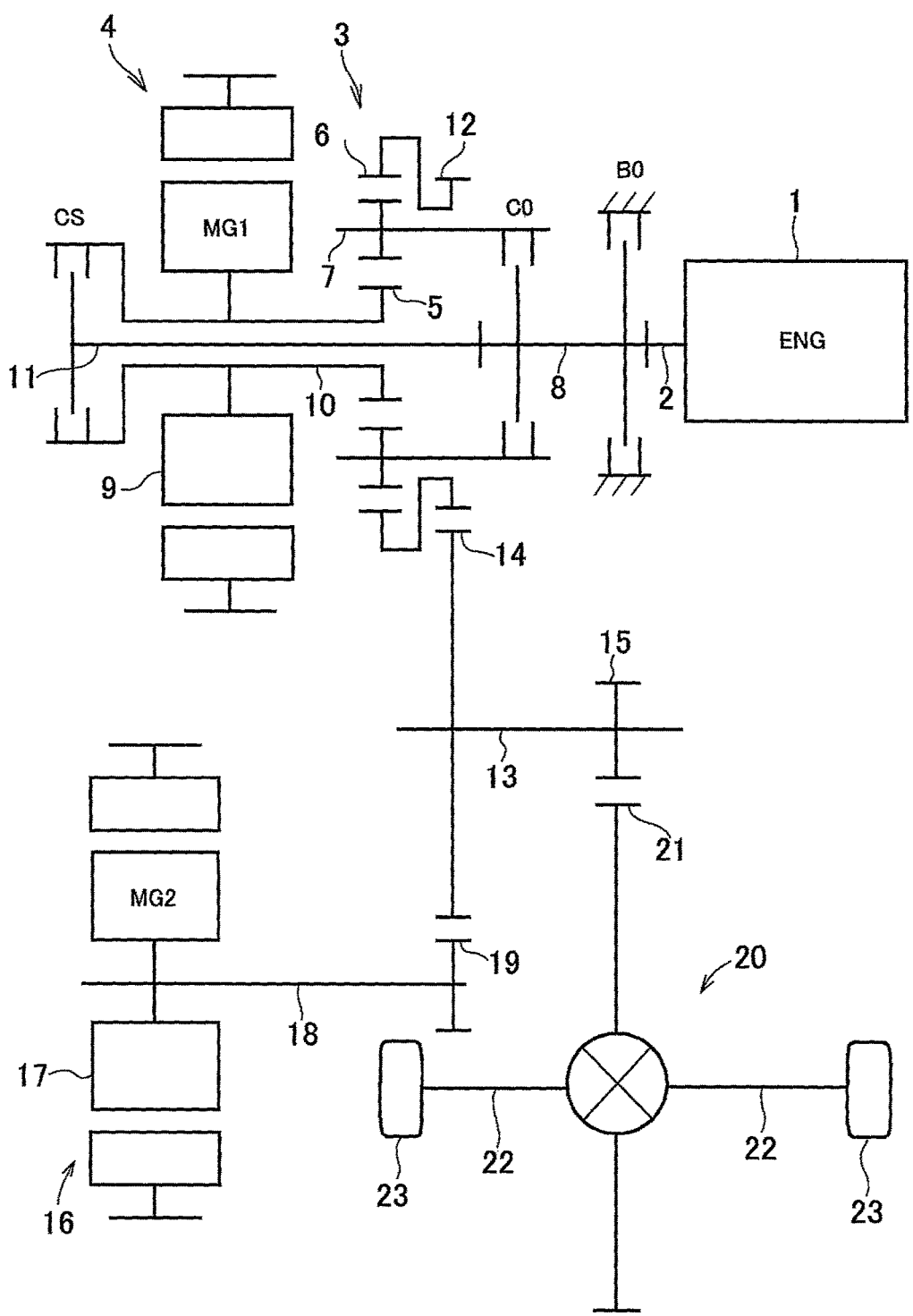
FIG. 2 is a schematic illustration showing one example of the vehicle to which the control system according to the present application is applied.

Turning to FIG. 1, there is shown an example of a routine executed by the control system according to the embodiment when shifting a shift position of the shifting device 24 from the Drive position (abbreviated as "D" in FIG. 1) to the Reverse position (abbreviated as "R" in FIG. 1) to reduce a shock.

First of all, it is determined at step S1 whether or not the position of the shifting device 24 is shifted from the Drive position to the Reverse position (via the Neutral position). If the shift position is in the Drive position so that the answer of step S1 is NO, the routine is returned without carrying out any specific control. By contrast, if the shift position is shifted to the Reverse position so that the answer of step s1 is YES, the routine progresses to step S2 to determine whether or not the operating mode was the EV mode before shifting the shift position to the Reverse position.

If the vehicle was propelled in the EV mode before shifting to the Reverse position so that the answer of step S2 is YES, the routine progresses to step S3 to propel the vehicle in the backward direction by rotating the second motor 16 in the reverse direction (i.e., in the opposite direction to a rotational direction of the engine 1). Then, the routine progresses to step S4 to determine whether or not the engine 1 is required to be started. In other words, the routine progresses to step S4 to determine whether or not a condition to start the engine 1 is satisfied. If the condition to start the engine 1 is satisfied so that the answer of step S4 is YES, the routine progresses to step S5 to start the engine 1 and then returned.

For example, the starting condition of the engine 1 includes an SOC level of the storage device and a temperature of the engine water, and the starting condition of the engine 1 is satisfied if at least one of the SOC level of the storage device detected by the HV-ECU 100 and the temperature of the engine water detected by an engine water sensor is lower than a first criterion level of the SOC level or a second criterion level of the engine water temperature. The determination at step S4 may also be made based on both of the SOC level of the storage device and the temperature of the engine water. In this case, determinations of the SOC level of the storage device and the temperature of the engine water may be made simultaneously. Alternatively, the determination of one of the SOC level of the storage device and the temperature of the engine water may also be made optionally depending on a determination result of the other parameter. In this case, an order or priority of the determinations may be changed flexibly according to need. If satisfaction of the starting condition of the engine 1 is determined at step S4, the engine is started at step S5 to propel the vehicle backwardly in the series mode. In this case, the storage device such as a battery may be charged with electricity generated by the first motor 4 driven by the engine 1. By contrast, if the starting condition of the engine 1 is not satisfied so that the answer of step S4 is NO, the vehicle is propelled backwardly in the EV mode.

If the vehicle was not propelled in the EV mode before shifting to the Reverse position so that the answer of step S2 is NO, the routine progresses to step S6 to determine whether or not the vehicle was propelled in the series mode before shifting to the Reverse position. If the answer of step S6 is YES, the routine progresses to step S7 to continue power generation of the first motor 4 by the engine 1 and engagement of the series clutch CS. Then, the routine progresses to step S9 to rotate the second motor 16 in the reverse direction to propel the vehicle in the backward direction.

By contrast, if the vehicle was not propelled in the series mode before shifting to the Reverse position so that the answer of step S6 is NO, this means that the vehicle was propelled in the series parallel mode before shifting to the Reverse position. In this case, the routine progresses to step S8 to continue operation of the engine 1 and engagement of the input clutch C0. Then, the routine also progresses to step S9 to rotate the second motor 16 in the reverse direction to propel the vehicle in the backward direction. Thus, if the vehicle was propelled in the series mode or the series parallel mode before shifting to the Reverse position, the vehicle is propelled in reverse without changing engagement states of the engagement devices such as input clutch C0 and the series clutch CS, and operating states of the prime movers such as the engine 1, the first motor 4 and the second motor 16.

Figure 8:
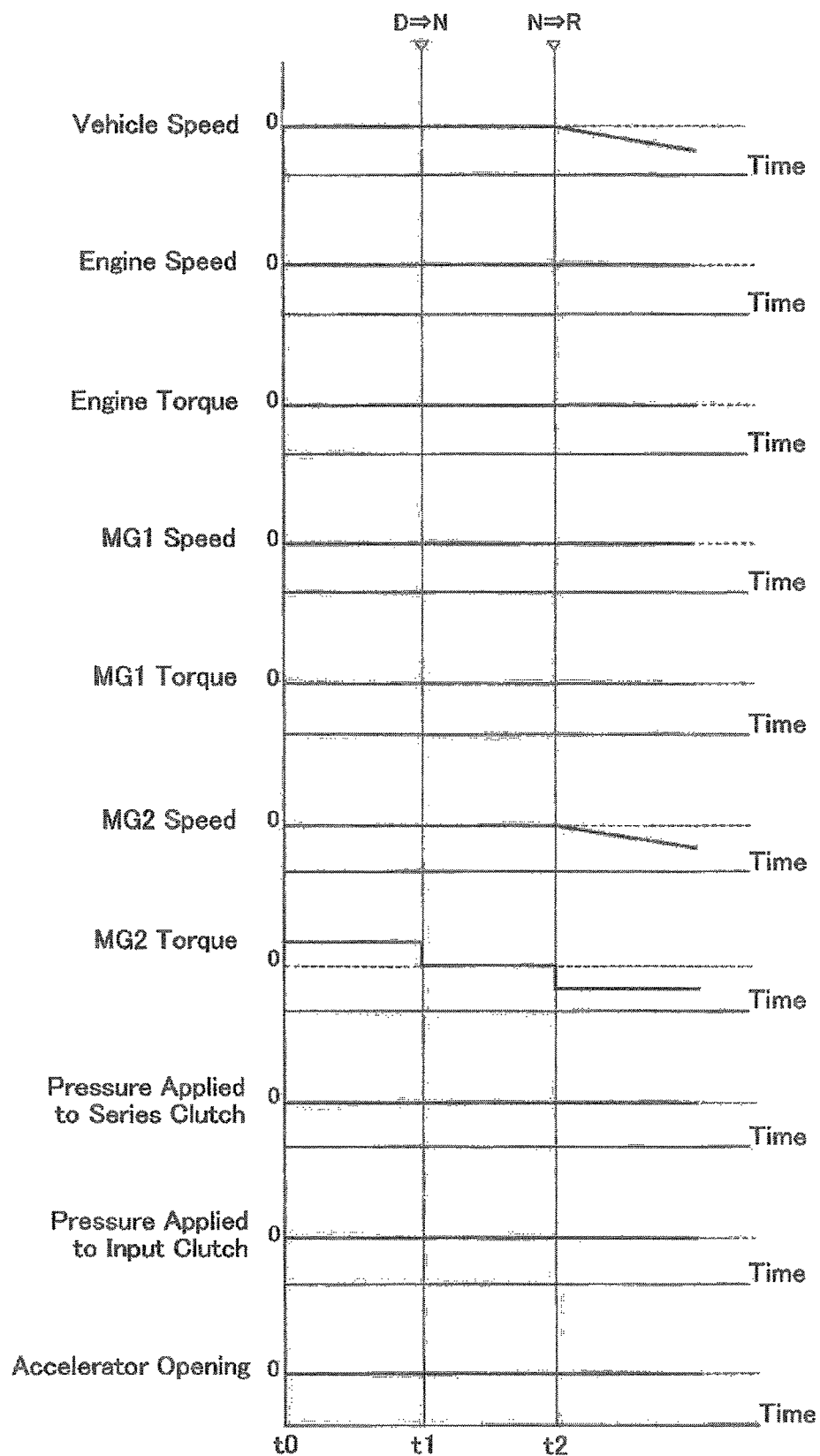
FIG. 8 is a time chart showing a temporal change in the condition of the vehicle when switching to the reverse range during forward propulsion in the disconnecting mode of the electric vehicle mode.

Turning to FIG. 8, there is shown a temporal change in the behavior of the vehicle when shifting the shift position to the Reverse position in the disconnecting mode of the single-motor mode. At point t0, the shift position is still in the Drive position and the accelerator pedal is not depressed. In this situation, since the shift position is still in the Drive position, the second motor 16 is still generating the forward torque. However, the brake pedal is depressed while disengaging both of the input clutch C0 and the series clutch CS so that the vehicle is stopped.

When the shift position is shifted at point t1 from the Drive position to the Neutral position to interrupt power transmission to the drive wheels, the second motor 16 is stopped and hence the output torque of the second motor 16 is reduced to zero. In this situation, the engine 1 and the first motor 4 are still stopped, and the input clutch C0 and the series clutch CS are disengaged. Then, when the shift position is further shifted from the Neutral position to the Reverse position at point t2, the second motor 16 is rotated in the reverse direction to generate the reverse torque, and the vehicle is allowed to propel in the backward direction by releasing the brake pedal. In this situation, the engine 1 and the first motor 4 are still stopped while disengaging the input clutch C0 and the series clutch CS. That is, the vehicle is allowed to be propelled backwardly in the disconnecting mode of the single-motor mode.

As described, if the vehicle was propelled in the EV mode before shifting the shift position to the Reverse position, the operating mode may be switched to the series mode upon satisfaction of the starting condition of the engine 1. However, even if the operating mode is switched to the series mode, the brake B0 and the input clutch C0 will not be engaged, that is, an engagement shock will not be generated. In addition, since both of the brake B0 and the input clutch C0 are in disengagement, an output torque of the engine 1 will not be added to the reverse torque of the second motor 16 for rotating the drive wheels 23 in reverse even if the operating mode is switched to the series mode.

Figure 9:
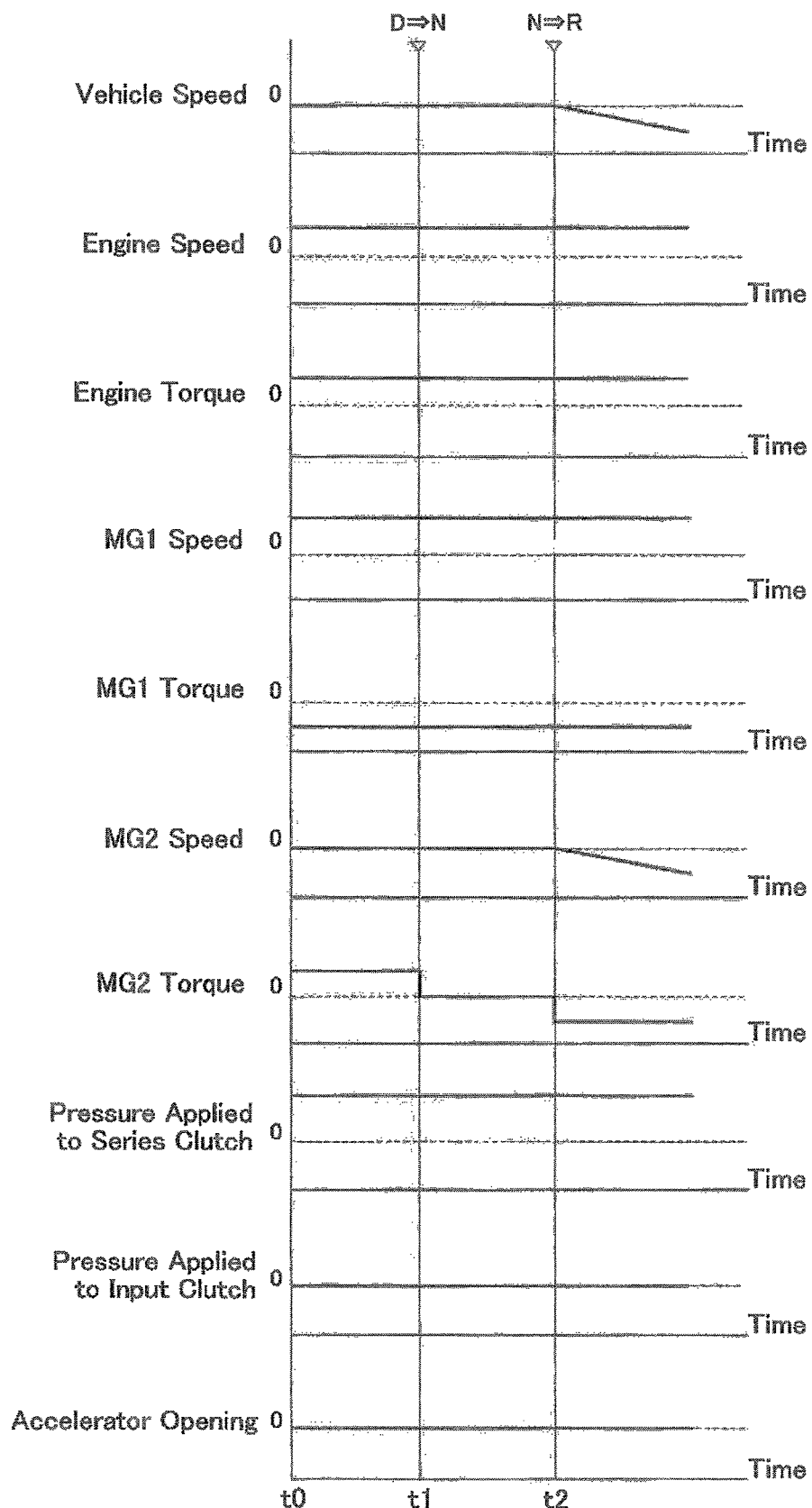
FIG. 9 is a time chart showing temporal changes in the condition of the vehicle.

Turning to FIG. 9, there is shown a temporal change in the behavior of the vehicle when shifting the shift position to the Reverse position in the series mode of the HV mode. At point t0, the operating mode is in the series mode in which the series clutch CS is engaged, and the shift position is still in the Drive position. In this situation, the first motor 4 is rotated by the engine 1 rotated at an idling speed to generate electric power, and the second motor 16 is operated by the electric power generated by the first motor 4 to generate the forward torque. However, the brake pedal is depressed so that the vehicle is stopped. When the shift position is shifted from the Drive position to the Neutral position at point t1, the second motor 16 is stopped and hence the output torque of the second motor 16 is reduced to zero. In this situation, the first motor 4 is still rotated by the idling engine 1 to generate an electric power, and the input clutch C0 is disengaged and the series clutch CS are engaged.

Then, when the shift position is further shifted from the Neutral position to the Reverse position at point t2, the second motor 16 is rotated in the reverse direction to generate the reverse torque, and the vehicle is allowed to propel in the backward direction by releasing the brake pedal. In this situation, the first motor 4 is still rotated by the idling engine 1 to generate an electric power while engaging the series clutch CS. That is, the vehicle is allowed to be propelled backwardly in the series mode.

Thus, if the vehicle was propelled in the series mode before shifting the shift position to the Reverse position, the vehicle is also propelled backwardly in the series mode. That is, engagement states of the input clutch C0 and the series clutch CS, and operating state of the engine 1 will not be changed even when the shift position is shifted to the Reverse position. For this reason, shocks can be reduced when switching a travelling direction to the backward direction.

Figure 10:
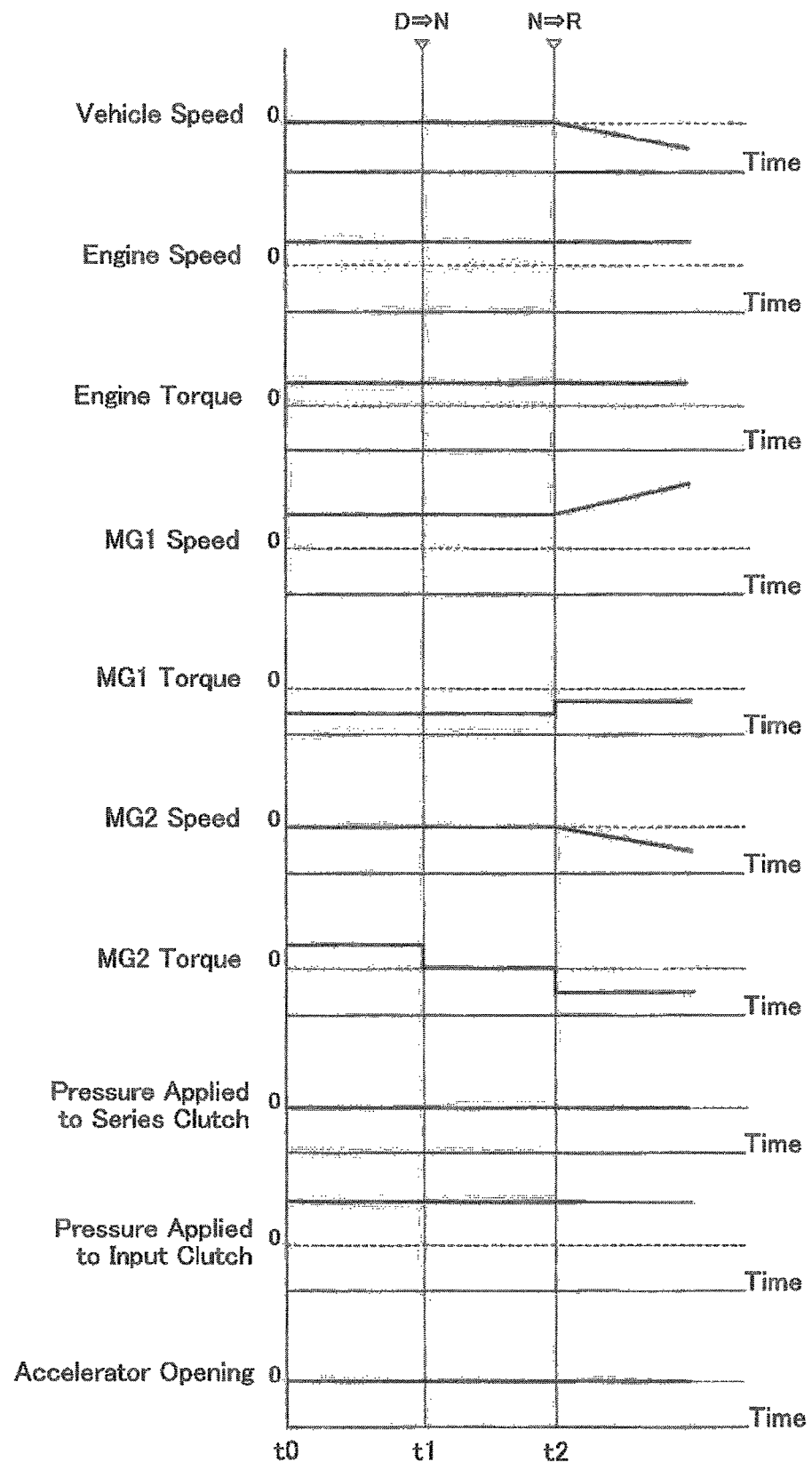
FIG. 10 is a time chart showing temporal changes in the condition of the vehicle.

Turning to FIG. 10, there is shown a temporal change in the behavior of the vehicle when shifting the shift position to the Reverse position in the series parallel mode of the HV mode. For example, the series parallel mode is selected when a large torque is required to launch the vehicle abruptly or to climb a hill, or when the sporty mode is selected. That is, FIG. 10 shows an example in which the vehicle propelled in the series parallel mode is stopped the vehicle abruptly and the shift position is shifted to the Reverse position. At point t0, the input clutch C0 is engaged, and the engine 1 is operated to generate a driving force and to rotate the first motor 4 to generate an electric power. In this situation, the brake pedal is depressed so that the vehicle is stopped.

When the shift position is shifted from the Drive position to the Neutral position at point t1, the second motor 16 is stopped and hence the output torque of the second motor 16 is reduced to zero. In this situation, the series clutch CS is disengaged and the input clutch C0 is engaged, and the first motor 4 is rotated by the idling engine 1 to generate an electric power.

Then, when the shift position is further shifted from the Neutral position to the Reverse position at point t2, the negative torque of the first motor 4 is reduced. In this situation, the output torque of the engine 1 is maintained to a certain level so that the rotational speed of the first motor 4 is increased in the forward direction. Meanwhile, the second motor 16 generates the reverse torque to propel the vehicle in the backward direction while cancelling the forward torque of the engine 1. That is, the vehicle is also propelled backwardly in the series parallel mode by the second motor 16 without changing engagement states of the input clutch C0 and the series clutch CS.

Thus, according to the embodiment, the operating mode of the vehicle is basically not changed even when shifting the shift range to the Reverse range unless the above-explained engine starting condition is satisfied. According to the embodiment, therefore, engagement shocks of the engagement devices will not be caused when shifting the shift range between the Drive range and the Reverse range. Here, the shifting device 24 may also be configured to shift the shift range directly between the Drive range to the Reverse range without passing through the Neutral range. In this case, the controller temporarily brings the vehicle into the neutral state when moving the shift lever directly from e.g., the Drive position to the Reverse position.

Figure 11:
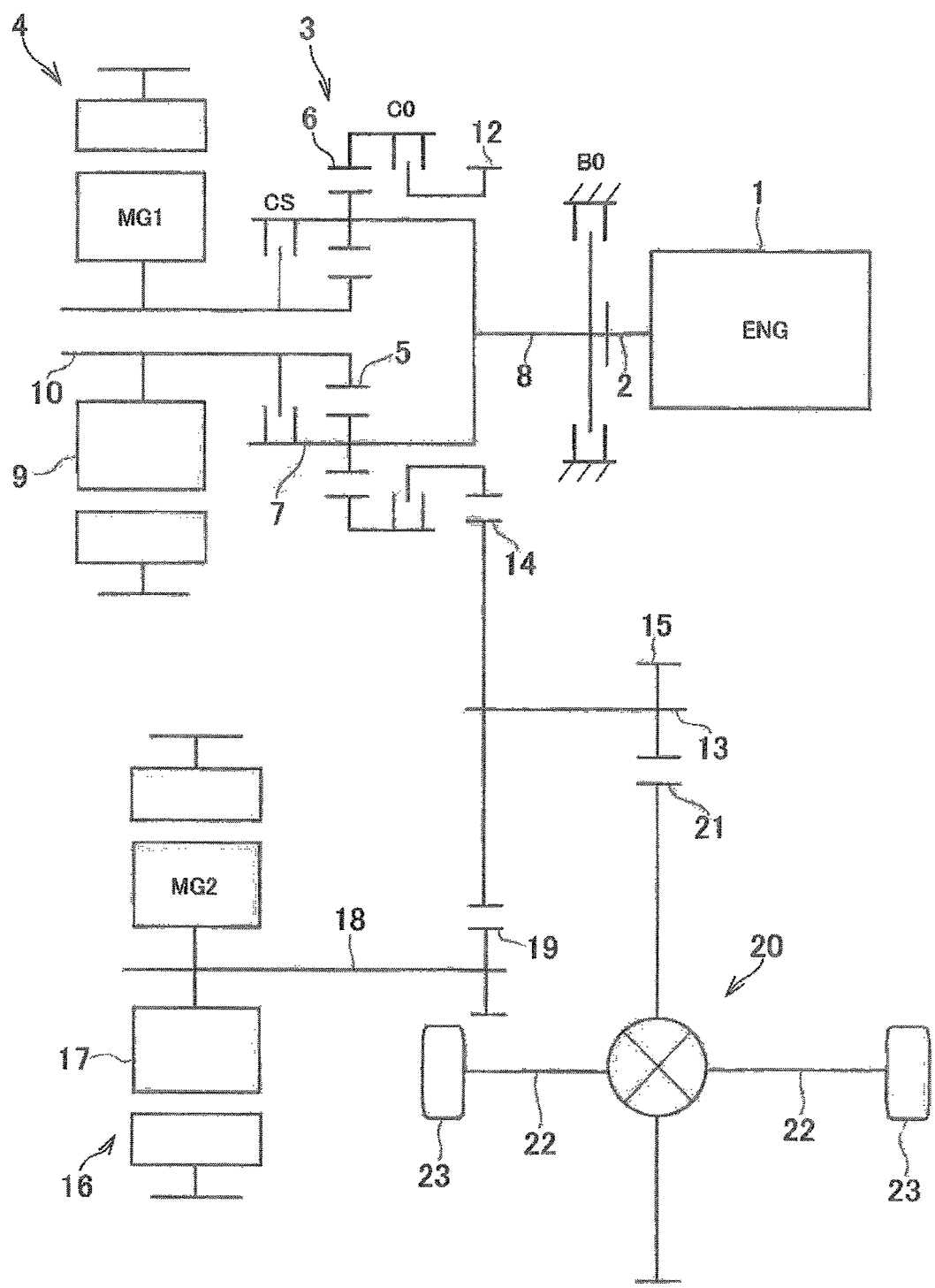
FIG. 11 is a schematic illustration showing another example of the vehicle to which the control system according to the present application is applied.

Turning to FIG. 11, there is shown another example of the vehicle to which the control system according to the present application is applied. In order to selectively transmit torque from the engine 1 to the output gear 12 through the power distribution device 3, the input clutch C0 may also be disposed between the ring gear 6 and the output gear 12. Likewise, in order to selectively transmit a torque from the engine 1 to the first motor 4, the series clutch CS may also be disposed between the carrier 7 and the first rotor shaft 10. The remaining structures are similar to those of the drive unit shown in FIG. 2, and detailed explanations for the common elements will be omitted by allotting common reference numerals thereto.

Figure 12A:
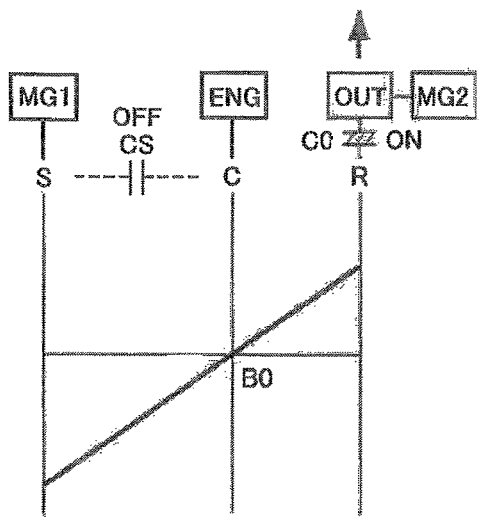
FIGS. 12a, 12b, 12c, 12d, 12e and 12f are nomographic diagrams showing status of the power distribution device shown in FIG. 11 in each operating mode.
Figure 12B:
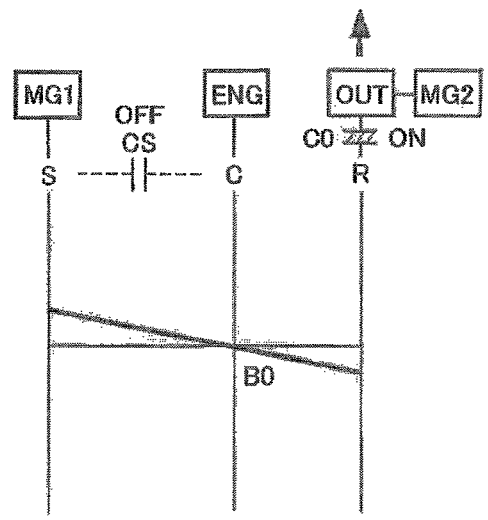

In the vehicle according to another example, the operating mode may also be selected from the above-explained EV mode and HV mode by manipulating the input clutch C0, the series clutch CS and the brake B0. Specifically, in the EV mode in which the vehicle is powered by the second motor 16, all of the input clutch C0, the series clutch CS and the brake B0 are disengaged. Consequently, the output gear 12 is disconnected from the ring gear 6 of the power distribution device 3 so that the sun gear 5, the ring gear 6 and the carrier 7 are prevented from being rotated. In this situation, if the input clutch C0 is engaged, the ring gear 6 is rotated together with the output gear 12, and since the ring gear 7 is halted together with the engine 1, the sun gear 5 and the first motor 4 connected thereto are rotated in the counter direction. As a result, the operating mode is shifted from the disconnecting mode to the connecting mode. A status of the power distribution device 3 in the connecting mode is indicated in a nomographic diagram shown in FIG. 12a. In this situation, the carrier 7 is allowed to establish a reaction torque against an output torque of the first motor 4 by engaging the brake B0 to halt the input shaft 8 and the carrier 7. Consequently, the operating mode is shifted to the dual-motor mode in which the vehicle is powered by the first motor 4 rotated in the counter direction and the second motor 16 rotated in the forward direction. FIG. 12b shows a status of the power distribution device 3 of the vehicle according to another example during reverse propulsion in the connecting mode. As can be seen from FIG. 12b, although positions of the input clutch C0 and the series clutch CS are altered, rotational directions of the sun gear 5, the ring gear 6 and the carrier 7 are similar to those in the nomographic diagram shown in FIG. 5b.

Figure 12C:
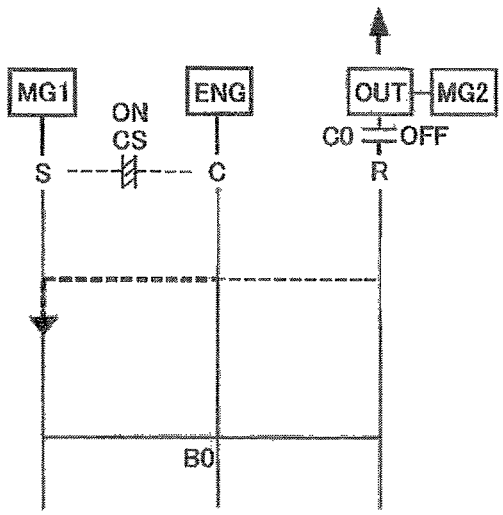

As described, in the series mode, the first motor 4 is operated as a generator by rotating the first motor 4 by the engine 1 while engaging the series clutch CS, and the second motor 16 is operated as a motor by the electric power generated by the first motor 4 to propel the vehicle. In the vehicle according to another example, the sun gear 5 is connected to the carrier 7 by the series clutch CS so that the power distribution device 3 is rotated integrally, and consequently the first motor 4 is rotated by the engine 1 to generate an electric power. In this situation, however, the input clutch C0 is in disengagement to disconnect the ring gear 6 from the output gear 12 and hence the output torque of the engine 1 will not be applied to the output gear 12. An operating state of the power distribution device 3 of the vehicle according to another example in the series mode is shown in FIG. 12c, and as shown in FIG. 12c, the sun gear 5, the ring gear 6 and the carrier 7 are rotated at a same speed. In the series mode, the vehicle is propelled backwardly by rotating the second motor 16 in reverse by the electric power generated by the first motor 4 operated by the engine 1.

Figure 12D:
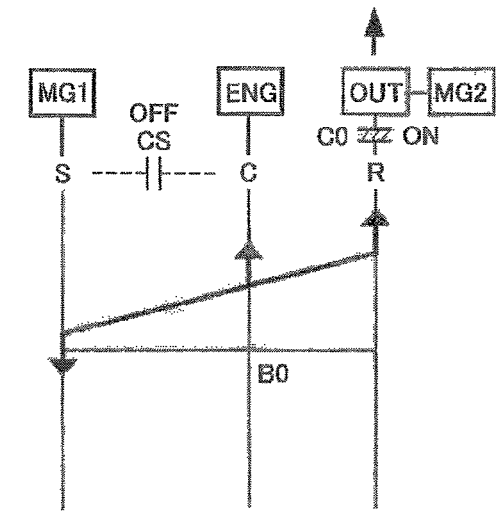
Figure 12E:
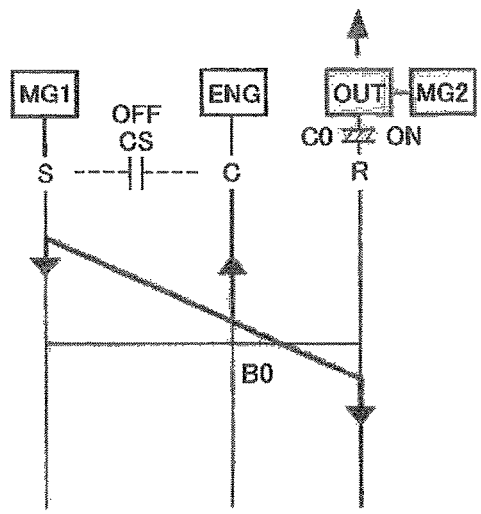

In the variable mode of the series parallel mode, the vehicle according to another example is propelled in the forward direction by controlling a rotational speed of the engine 1 by the first motor 4 while operating the second motor 16 by the electric power generated by the first motor 4. A status of the power distribution device 3 of the vehicle according to another example in the variable mode of the series parallel mode during forward propulsion is indicated in a nomographic diagram shown in FIG. 12d. As can be seen from FIG. 12d, although positions of the input clutch C0 and the series clutch CS are altered, rotational directions of the sun gear 5, the ring gear 6 and the carrier 7 are similar to those in the nomographic diagram shown in FIG. 6a. In the series parallel mode, the vehicle according to another example is propelled in reverse by rotating the first motor 4 in the forward direction by the engine 1 to generate an electric power, and by rotating the second motor 16 in reverse by the electric power generated by the first motor 4 while engaging the input clutch C0. A status of the power distribution device 3 of the vehicle according to another example in the variable mode of the series parallel mode during backward propulsion is indicated in a nomographic diagram shown in FIG. 12e. As can be seen from FIG. 12e, although positions of the input clutch C0 and the series clutch CS are altered, rotational directions of the sun gear 5, the ring gear 6 and the carrier 7 are similar to those in the nomographic diagram shown in FIG. 6b.

Figure 12F:
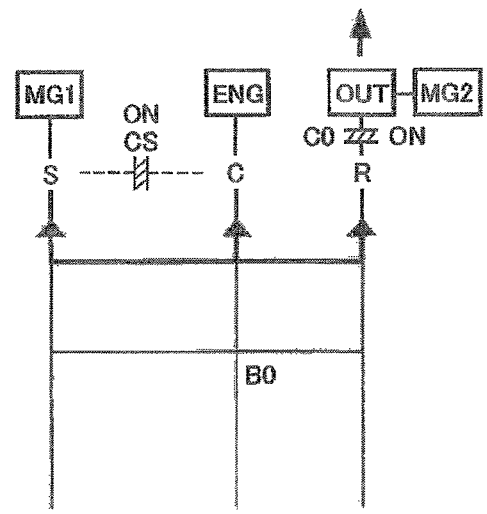

During forward propulsion in the series parallel mode, the fixed mode is also established in the vehicle according to another example by engaging the input clutch C0 and the series clutch CS. FIG. 12f shows an operating state of the power distribution device 3 of the vehicle according to another example in the fixed mode. In this case, since the input clutch C0 and the series clutch CS are engaged, the carrier 7 is connected to the sun gear 5 so that the power distribution device 3 is rotated integrally. As can be seen from FIG. 12f, although positions of the input clutch C0 and the series clutch CS are altered, rotational directions of the sun gear 5, the ring gear 6 and the carrier 7 are similar to those in the nomographic diagram shown in FIG. 6c.

Although the above exemplary embodiments of the present application have been described, it will be understood by those skilled in the art that the present application should not be limited to the described exemplary embodiments, and various changes and modifications can be made within the spirit and scope of the present application. For example, the routine shown in FIG. 1 may be modified to be executed in a case of shifting a shift position from the Reverse position to the Drive position (through the Neutral position).

What is claimed is:

1. A driving force control system for a hybrid vehicle comprising:
   an engine;
   a first motor having a generating function;
   a power distribution device that performs a differential action among an input element to which a torque of the engine is applied, a reaction element to which a torque of the first motor is applied, and an output element;
   an output member to which a torque is delivered from the output element;
   a first clutch that selectively allows torque transmission between the engine and a rotor of the first motor;
   a second clutch that selectively allows torque transmission between the engine and the output member through the power distribution device; and
   a second motor that is activated by an electric power generated by the first motor to generate a drive torque to propel the vehicle,
   wherein an operating mode can be selected at least from:
   a series mode in which the first clutch is engaged, the first motor is rotated by the engine to generate electric power, and the second motor is operated by the electric power generate by the first motor to propel the vehicle; and a series parallel mode in which at least the second clutch is engaged, and the vehicle is powered by the engine and the second motor,
   the driving force control system comprising:
   a shifting device that switches a travelling direction of the vehicle between forward direction and backward direction; and
   a controller that controls the operating mode of the vehicle;
   wherein the controller is configured to maintain the previous operating mode after switching the travelling direction of the vehicle by the shifting device.

2. The driving force control system for a hybrid vehicle as claimed in claim 1, wherein the controller is further configured to maintain the operating mode of the vehicle to the series mode after switching the travelling direction of the vehicle by the shifting device, if the vehicle was propelled in the series mode before switching the travelling direction of the vehicle.

3. The driving force control system for a hybrid vehicle as claimed in claim 2,
   wherein the operating mode of the vehicle can be further selected from an electric vehicle mode in which the vehicle is powered at least by the second motor, and
   wherein the controller is further configured to
   maintain the operating mode to the electric vehicle mode after switching the travelling direction of the vehicle by the shifting device unless a predetermined engine starting condition is satisfied, if the vehicle was propelled in the electric vehicle mode before switching the travelling direction of the vehicle, and
   shift the operating mode to the series mode after switching the travelling direction of the vehicle by the shifting device upon satisfaction of the predetermined engine starting condition, if the vehicle was propelled in the electric vehicle mode before switching the travelling direction of the vehicle.

4. The driving force control system for a hybrid vehicle as claimed in claim 1, wherein the controller is further configured to maintain the operating mode of the vehicle to the series parallel mode after switching the travelling direction of the vehicle by the shifting device, if the vehicle was propelled in the series parallel mode before switching the travelling direction of the vehicle.

5. The driving force control system for a hybrid vehicle as claimed in claim 4,
   wherein the operating mode of the vehicle can be further selected from an electric vehicle mode in which the vehicle is powered at least by the second motor, and
   wherein the controller is further configured to
   maintain the operating mode to the electric vehicle mode after switching the travelling direction of the vehicle by the shifting device unless a predetermined engine starting condition is satisfied, if the vehicle was propelled in the electric vehicle mode before switching the travelling direction of the vehicle, and
   shift the operating mode to the series mode after switching the travelling direction of the vehicle by the shifting device upon satisfaction of the predetermined engine starting condition, if the vehicle was propelled in the electric vehicle mode before switching the travelling direction of the vehicle.

6. The driving force control system for a hybrid vehicle as claimed in claim 1,
   wherein the operating mode of the vehicle can be further selected from an electric vehicle mode in which the vehicle is powered at least by the second motor, and
   wherein the controller is further configured to
   maintain the operating mode to the electric vehicle mode after switching the travelling direction of the vehicle by the shifting device unless a predetermined engine starting condition is satisfied, if the vehicle was propelled in the electric vehicle mode before switching the travelling direction of the vehicle, and
   shift the operating mode to the series mode after switching the travelling direction of the vehicle by the shifting device upon satisfaction of the predetermined engine starting condition, if the vehicle was propelled in the electric vehicle mode before switching the travelling direction of the vehicle.

* * * * *